Patented Jan. 26, 1937

2,069,165

UNITED STATES PATENT OFFICE 2,069,165

ORGANO-MERCURY 1,2-ALIPHATIC-DI-AMINE SULPHITES, AND PROCESS OF PRODUCING THEM

Morris S. Kharasch, Chicago, Ill., assignor to Eli Lilly and Company, Indianapolis, Ind., a corporation of Indiana No Drawing. Application June 23, 1934, Serial No. 732,087

18 Claims. (Cl. 260—13)

The object of my invention is water-soluble organo-mercury 1,2-aliphatic-diamine sulphites, and the process of producing them. I accomplish this by the interaction in water of insoluble or relatively insoluble organo-mercury compounds and 1,2-aliphatic-diamine sulphites.

A number of organo-mercuric compounds are known which have potential effectiveness as bactericidal, fungicidal, and aphidcidal agents, but which are greatly limited in their application by reason of their low water-solubility, sometimes amounting to substantial insolubility. These have the general formula R—Hg—Neg, in which R represents an alkyl or aryl radical, and Neg represents any negative ion, such for instance as the hydroxyl ion, a halogen, or an acid radical such as the acetic-acid radical or the thiocyanic-acid or the sulphuric-acid radical. Outstanding examples of these are phenyl-mercuric chloride (or bromide or iodide or hydroxide or acetate or thiocyanate or sulphate, etc.), and ethyl-mercuric chloride (or bromide or iodide or thiocyanate or sulphate, etc.

It is known that such organo-mercuric compounds can be temporarily converted into compounds of greater water solubility by causing them to react with sodium sulphite. In this way the effective organo-mercuric radical may be temporarily put into water solution. A typical example, using phenyl-mercuric chloride, of the reaction which produces the temporary solubility is as follows:

(1) 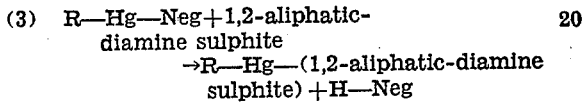

But the R-mercury-sodium-sulphite complex thus formed is not stable, and the solubility which is obtained is exceedingly evanescent; for said complex tends to break down by a "bridging" reaction to form an insoluble "bis" organo-mercuric compound R—Hg—R, as exemplified by the following equation showing the breaking down of phenyl-mercuric sodium sulphite into mercuric-sodium sulphite and the insoluble mercury di-phenyl:

(2) 

In time, of course, the mercuric sodium sulphite is broken down still further.

Because of this bridging reaction, and the resultant breaking-down, the solubility which is sometimes obtained by treating the insoluble organo-mercuric compound with sodium sulphite is of such short duration that it is practically valueless; for it is a progressive breakdown which proceeds from the moment the materials are mixed until the reaction, in the sense indicated in Equation 2, is complete.

I have found that by treating the initial and relatively insoluble organo-mercuric compounds with a 1,2-aliphatic-diamine sulphite, I am able to produce a relatively permanent water solution containing the desired organo-mercuric radical. The following general equation shows the nature of this reaction:

(3)  R—Hg—Neg+1,2-aliphatic-diamine sulphite
   →R—Hg—(1,2-aliphatic-diamine sulphite) +H—Neg Where R represents an alkyl or aryl radical, and Neg represents any negative ion, which will not form with the products of reaction an insoluble mercury compound. An example of this, with phenyl-mercuric chloride as the initial mercurial, and with 1,2-ethylenediamine sulphite as the 1,2-aliphatic sulphite, is as follows:

(4) 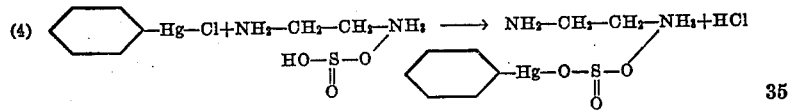

Another example is the reaction of ethyl-mercuric chloride with 1,2-propylenediamine sulphite, represented as follows:

(5) 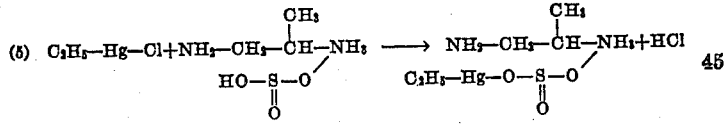

The phenyl group and the ethyl group are merely typical examples of aryl and alkyl radicals which R may represent. Instead of the ethyl group, any alkyl radical of the paraffin series may be used, at least up to those having six carbon atoms, such for instance as methyl, propyl, butyl, isobutyl, amyl and its various isomers, and hexyl and its various isomers. Similarly, instead of the phenyl group, various other aryl radicals may be used, such for instance as tolyl, p-chlorophenyl, p-bromophenyl, or xylyl. Also, if R represents an aryl radical, it is not necessarily with the mercury joined to a benzene ring; for the ring may be of other types than the benzene ring, such for instance as cyclohexyl and cyclopentyl, and even if it is a benzene ring there may be one or more intervening methylene groups such for instance as in the benzyl and phenyl-ethyl radicals.

All of the variations of which these are examples are included in my invention.

Similarly, in place of having chlorine as the negative ion in the reaction, other negative ions may be in the initial organo-mercuric compounds, such for instance as another halogen, or the hydroxyl group, or an acid radical such as the acetic-acid radical or the sulphuric-acid radical or the thiocyanic-acid radical.

With any of these variations, sulphites of any of the 1,2-aliphatic-diamines may be used. Chief among these are 1,2-ethylene-diamine sulphite and 1,2-propylenediamine sulphite; but these are named as examples and not as limitations.

In this way I can form stable and permanent solutions of a number of compounds of this general class. These include the following:

a. Phenyl-mercuric ethylenediamine sulphite,
 b. Tolyl-mercuric ethylenediamine sulphite,
 c. Cyclohexyl-mercuric ethylenediamine sulphite,
 d. Cyclopentyl-mercuric ethylenediamine sulphite,
 e. Benzyl-mercuric ethylenediamine sulphite,
 f. Methyl-mercuric ethylenediamine sulphite,
 g. Ethyl-mercuric ethylenediamine sulphite,
 h. Propyl-mercuric ethylenediamine sulphite,
 i. Butyl-mercuric ethylenediamine sulphite,
 j. Amyl-mercuric ethylenediamine sulphite,
 k. Hexyl-mercuric ethylenediamine sulphite,
 l. Phenyl-mercuric propylenediamine sulphite,
 m. Tolyl-mercuric propylenediamine sulphite,
 n. Cyclohexyl-mercuric propylenediamine sulphite,
 o. Cyclopentyl-mercuric propylenediamine sulphite,
 p. Benzyl-mercuric propylenediamine sulphite,
 q. Methyl-mercuric propylenediamine sulphite,
 r. Ethyl-mercuric propylenediamine sulphite,
 s. Propyl-mercuric propylenediamine sulphite,
 t. Butyl-mercuric propylenediamine sulphite,
 u. Amyl-mercuric propylenediamine sulphite, and
 v. Hexyl-mercuric propylenediamine sulphite.

Any of these compounds are effective as bactericides, fungicides, (for seed fungi, such for instance as diplodia and fusaria, as well as for the fungi which cause the blue stain of lumber, etc.), and aphidcides; and are effective in the treatment of small grains, and in the treatment and prevention of blue stain in lumber. Generally speaking, they are substantially as active bactericidally as are the organo-mercuric compounds from which they were derived; and they have not only the advantage of relatively high solubility, but the additional advantage that they are substantially free from the erythema-producing properties so common to mercurials.

In general, in order to get the desired reaction and the desired solubility, it is desirable in carrying out the reaction indicated by Equation 3 to use more than a molecular equivalent of the 1,2-aliphatic-diamine sulphite, preferably three or more moles thereof.

When the organo-mercuric-1,2-aliphatic diamine sulphite is obtained in water solution by the reaction shown in Equation 3 above, it is desirable that the solution be kept at least as alkaline as pH 6.5; it is better that it be kept at least as alkaline as pH 7.2; and preferably at about pH 8.0. To obtain this pH value, it is desirable to add the necessary amount of a 1,2-aliphatic diamine (not the sulphite thereof), such for instance as ethylenediamine. If the solution is allowed to become too acid, its stability is decreased. If concentrated hydrochloric acid is added, a precipitate is in most instances produced.

The solutions of these compounds can be made of various strengths, in every instance up to at least an effective bactericidal strength, such for instance as a concentration of 1:1000. In many instances, as in ethyl-mercuric ethylenediamine sulphite, obtained by the reaction of ethyl-mercuric chloride with 1,2-ethylenediamine sulphite, I can obtain solutions many times more concentrated than that, frequently up to a concentration exceeding 0.5% and in some instances even reaching 1 to 2%. The concentrations obtainable are far in excess of those obtainable with the corresponding initial organo-mercuric compounds—such for instance as ethyl-mercuric chloride in the example given.

In preparing these organo-mercuric-aliphatic-diamine sulphites, I find it desirable to use a procedure which is exemplified by the following example; in which phenyl-mercuric chloride is treated with 1,2-ethylenediamine sulphite:

One gram of phenyl-mercuric chloride is desirably first moistened with a small quantity of alcohol or acetone. Then a quantity of water, usually about 100 cc., is added. An immediate precipitate occurs. This precipitate, without removing the alcohol or acetone, is treated with a water solution of three or four molecular equivalents of 1,2-ethylenediamine sulphite, conveniently in 50 or 100 cc. of water. Most of the precipitate dissolves at once. Enough water is then added to make a total volume of 1000 cc., and the whole is filtered. The solution thus obtained is quite stable, particularly when brought to a pH of 8.0 by the addition of 1,2-ethylenediamine or some other base. It does not precipitate any mercury di-phenyl, such as is characteristic when an interaction is obtained between phenyl-mercuric chloride and sodium sulphite.

Since the phenyl-mercuric-ethylenediamine sulphite complex exists in solution in the presence of chloride ions, which have a tendency to reverse the reaction to re-form the initial insoluble phenyl-mercuric chloride, it is desirable to employ an excess of the ethylenediamine sulphite, such for instance as 3 moles or more; for this prevents that metathetical reaction from taking place. In addition, I prefer to add sufficient ethylenediamine, (not ethylenediamine sulphite), to produce about pH 8.0.

The 1,2-aliphatic-diamine sulphites which are used in my process of producing organo-mercuric-1,2-aliphatic-diamine sulphites are themselves new. They are described in my co-pending application Serial No. 725,483, filed May 14, 1934.

Such 1,2-aliphatic-diamine sulphites may be prepared in various ways. Perhaps the simplest way is by causing the desired 1,2-aliphatic-diamine to react with sulphur dioxide or with sulphurous acid; as by passing sulphur dioxide into either an absolute or aqueous alcohol solution of the desired 1,2-aliphatic-diamine (such as 1,2-ethylenediamine or 1,2-propylenediamine) or into an acetone solution of such diamine; upon which the corresponding 1,2-aliphatic-diamine sulphite separates in solid form.

Ethylenediamine acid sulphite melts at 173-175° C., with decomposition. It is white, and quite soluble in water. Its water solution is about pH 6.7. The analysis of the salt for nitrogen and sulphur indicates that it contains one mole of ethylenediamine to one mole of sulphurous acid. It is quite stable in solution against oxidation by oxygen in the presence of metal catalysts. It probably has the following formula:

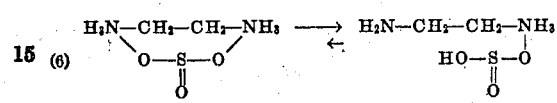

If ethylenediamine sulphite is formed in a solution containing an excess of ethylenediamine, or if ethylenediamine acid sulphite is dissolved in water containing an excess of ethylenediamine, normal ethylenediamine sulphite is formed in the solution; as for instance if the hydrogen ion concentration is adjusted to pH 8.0 by the addition of ethylenediamine, as was stated earlier in this specification as desirable. I have not separated the normal ethylenediamine sulphite in solid form. Probably there is complete or substantially complete ionization of the ethylenediamine sulphite, whether acid or normal, in solution. Either the acid salt or the normal salt is effective in carrying out in substance, with the obvious variations necessitated by the use of the normal salt as one of the initial reactants, the reactions of Equations 3, 4, and 5, to produce the desired organo-mercury 1,2-aliphatic-diamine sulphite; although, as already stated, I prefer to have the solution alkaline by reason of the presence of an excess of ethylenediamine, which in effect involves the presence of the normal ethylenediamine sulphite.

Propylenediamine acid sulphite melts at 162° C., with decomposition. In general it corresponds to ethylenediamine sulphite, save for the additional methylene group in propylene; and like ethylenediamine sulphite is quite stable in solution against oxidation by oxygen in the presence of metal catalysts.

I claim as my invention:—

1. A compound of the radical R—Hg— with a lower 1,2-aliphatic-diamine sulphite having the following formula:

R—Hg—(1,2-aliphatic-diamine sulphite)

where R represents a radical of the class consisting of alkyl radicals having between 1 and 6 carbon atoms and radicals of the benzene and the cycloparaffin series.

2. A water-soluble compound produced by the reaction of a solution of a lower 1,2-aliphatic-diamine sulphite with an organo-mercuric compound of the general formula R—Hg—Neg, where R represents a radical of the class consisting af alkyl radicals having between 1 and 6 carbon atoms and radicals of the benzene and the cycloparaffin series, and Neg represents a negative ion which will not form with the products of reaction an insoluble mercury compound.

3. A phenyl-mercuric-1,2 - aliphatic - diamine sulphite, where the 1,2-aliphatic-diamine radical is of a lower 1,2-aliphatic-diamine.

4. An ethyl-mercuric-1,2 - aliphatic - diamine sulphite, where the 1,2-aliphatic-diamine radical is of a lower 1,2-aliphatic-diamine.

5. Phenyl - mercuric-1,2-ethylenediamine sulphite.

6. Ethyl - mercuric - 1,2 - ethylenediamine sulphite.

7. The process of producing a water-soluble mercurial, which consists in reacting a solution of an excess of a lower 1,2-aliphatic-diamine sulphite with a compound of the general formula R—Hg—Neg, in which R represents a radical of the class consisting of alkyl radicals having between 1 and 6 carbon atoms and radicals of the benzene and the cycloparaffin series, and Neg represents a negative ion which will not form with the products of reaction an insoluble mercury compound.

8. The process of producing a water-soluble mercurial, which consists in reacting a solution of a lower 1,2-aliphatic-diamine sulphite with a compound of the general formula R—Hg—Neg, in which R represents a radical of the class consisting of alkyl radicals having between 1 and 6 carbon atoms and radicals of the benzene and the cycloparaffin series, and Neg represents a negative ion which will not form with the products of reaction an insoluble mercury compound.

9. The process of producing a water-soluble mercurial, which consists in reacting a solution of an excess of a lower 1,2-aliphatic-diamine sulphite with a compound of the general formula R—Hg—Cl, in which R represents a radical of the class consisting of alkyl radicals having between 1 and 6 carbon atoms and radicals of the benzene and the cycloparaffin series.

10. The process of producing a water-soluble mercurial, which consists in reacting a solution of a lower 1,2-aliphatic-diamine sulphite with a compound of the general formula R—Hg—Cl, in which R represents a radical of the class consisting of alkyl radicals having between 1 and 6 carbon atoms and radicals of the benzene and the cycloparaffin series.

11. The process of producing a water-soluble mercurial, which consists in reacting a solution of an excess of 1,2-ethylenediamine sulphite with a compound of the general formula R—Hg—Neg, in which R represents a radical of the class consisting of alkyl radicals having between 1 and 6 carbon atoms and radicals of the benzene and the cycloparaffin series, and Neg represents a negative ion which will not form with the products of reaction an insoluble mercury compound.

12. The process of producing a water-soluble mercurial, which consists in reacting a solution of 1,2-ethylene-diamine sulphite with a compound of the general formula R—Hg—Neg, in which R represents a radical of the class consisting of alkyl radicals having between 1 and 6 carbon atoms and radicals of the benzene and the cycloparaffin series, and Neg represents a negative iron which will not form with the products of reaction an insoluble mercury compound.

13. The process of producing a water-soluble mercurial, which consists in reacting a solution of an excess of 1,2-ethylenediamine sulphite with a compound of the general formula R—Hg—Cl, in which R represents a radical of the class consisting of alkyl radicals having between 1 and 6 carbon atoms and radicals of the benzene and the cycloparaffin series.

14. The process of producing a water-soluble mercurial, which consists in reacting a solution of 1,2-ethylene diamine sulphite with a compound of the general formula R—Hg—Cl, in which R represents a radical of the class consisting of alkyl radicals having between 1 and 6 carbon atoms and radicals of the benzene and the cycloparaffin series.

15. The process of producing a water-soluble mercurial, which consists in reacting a solution of an excess of 1,2-ethylenediamine sulphite with phenyl-mercuric chloride.

16. The process of producing a water-soluble mercurial, which consists in reacting a solution of 1,2-ethylenediamine sulphite with phenyl-mercuric chloride.

17. The process of producing a water-soluble mercurial, which consists in reacting a solution of an excess of 1,2-ethylenediamine sulphite with ethyl-mercuric chloride.

18. The process of producing a water-soluble mercurial, which consists in reacting a solution of 1,2-ethylenediamine sulphite with ethyl-mercuric chloride.

MORRIS S. KHARASCH.